(12) United States Patent
Miyashita

(10) Patent No.: US 10,655,546 B2
(45) Date of Patent: May 19, 2020

(54) CONTROL DEVICE FOR INTERNAL COMBUSTION ENGINE

(71) Applicant: TOYOTA JIDOSHA KABUSHIKI KAISHA, Toyota-shi, Aichi-ken (JP)

(72) Inventor: Shigeki Miyashita, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/245,659

(22) Filed: Jan. 11, 2019

(65) Prior Publication Data

US 2019/0277204 A1 Sep. 12, 2019

(30) Foreign Application Priority Data

Mar. 7, 2018 (JP) .................................. 2018-040806

(51) Int. Cl.
| | |
|---|---|
| *F02D 41/06* | (2006.01) |
| *F02D 13/02* | (2006.01) |
| *F02D 41/00* | (2006.01) |
| *F01L 13/08* | (2006.01) |
| *F02P 9/00* | (2006.01) |
| *F01L 1/24* | (2006.01) |
| *F02N 19/00* | (2010.01) |
| *F01L 13/00* | (2006.01) |
| *F01L 1/18* | (2006.01) |

(52) U.S. Cl.
CPC ........ *F02D 13/0203* (2013.01); *F01L 1/2405* (2013.01); *F01L 13/08* (2013.01); *F02D 13/0226* (2013.01); *F02D 41/0002* (2013.01); *F02N 19/004* (2013.01); *F02P 9/002* (2013.01); *F01L 1/185* (2013.01); *F01L 2013/101* (2013.01); *F01L 2013/103* (2013.01); *F01L 2800/01* (2013.01); *F02D 41/064* (2013.01); *F02D 2013/0292* (2013.01); *F02D 2041/001* (2013.01); *F02D 2041/002* (2013.01); *F02N 2019/002* (2013.01)

(58) Field of Classification Search
CPC ............. F02D 13/0203; F02D 13/0226; F02D 41/0002; F02D 41/064; F02D 2041/001; F02D 2041/002; F02D 2013/0292; F02N 19/004; F02N 2019/002; F01L 1/2405; F01L 1/185; F01L 13/08; F01L 2013/103; F01L 2013/101; F01L 2800/01; F02P 9/002
USPC .... 123/90.15, 299, 305, 491, 406.53, 179.5, 123/179.16, 179.18; 701/103, 113
See application file for complete search history.

(56) References Cited

U.S. PATENT DOCUMENTS 7,406,942 B2 * 8/2008 Ashizawa ............. F02B 23/101
123/295

FOREIGN PATENT DOCUMENTS

JP 2014-047695 A 3/2014

\* cited by examiner

*Primary Examiner* — Hai H Huynh
(74) *Attorney, Agent, or Firm* — Oliff PLC

(57) ABSTRACT

Provided is a control device for controlling an internal combustion engine including a fuel injection valve, an ignition device, and a variable valve operating device configured to switch between a base opening/closing mode of an intake valve and a continuous valve opening mode. The control device is configured to execute a cold start control at a cold start. The cold start control includes: a startability improvement processing executed in a predetermined number of cycles after the start of cranking; and a combustion start processing executed after this predetermined number of cycles. In the startability improvement processing, the continuous valve opening mode is selected in at least an expansion stroke and an exhaust stroke, and fuel injection is executed without ignition. In the combustion start processing, the base opening/closing mode is selected continuously during one cycle, and ignition is executed.

10 Claims, 7 Drawing Sheets

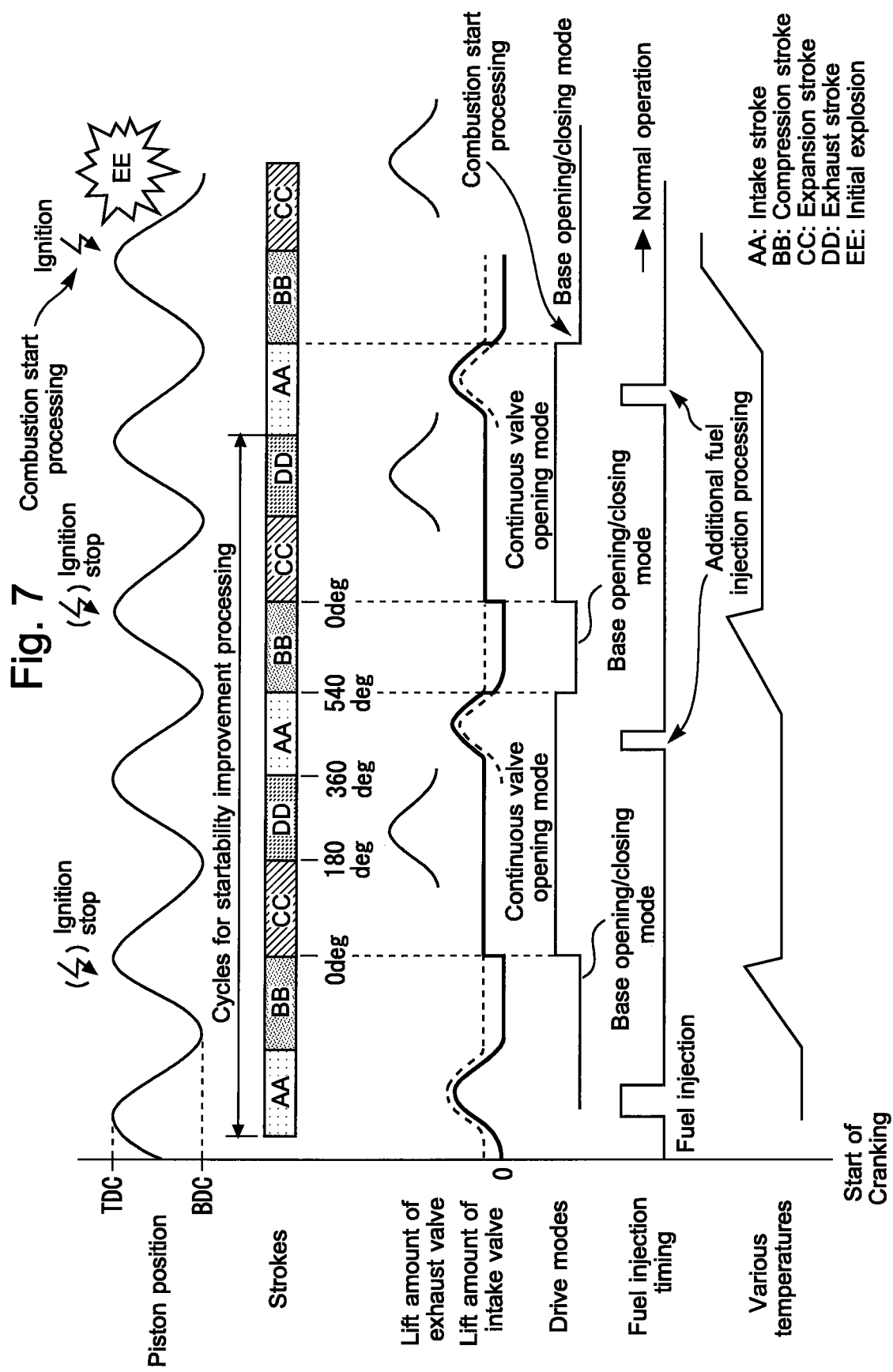

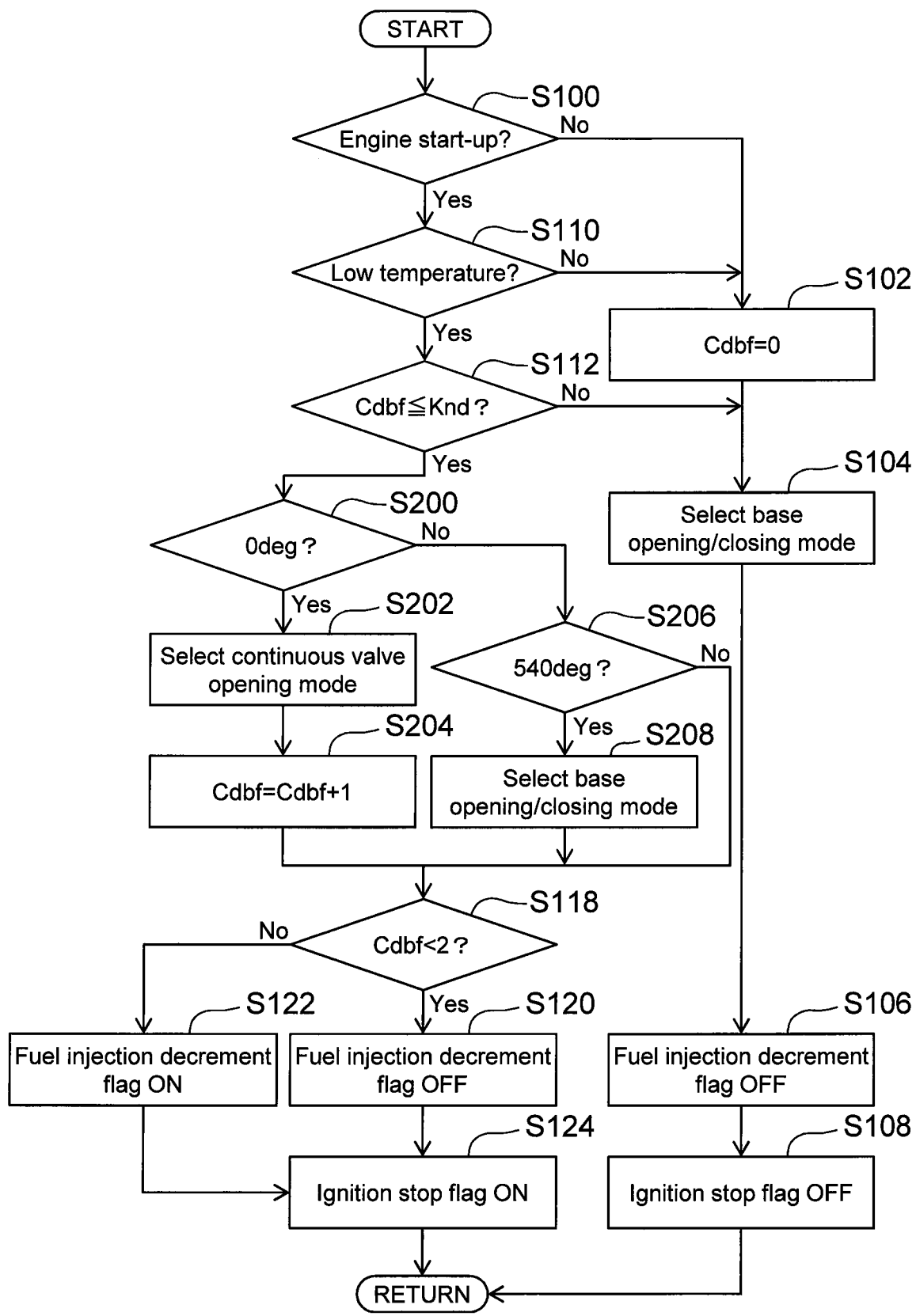

CONTROL DEVICE FOR INTERNAL COMBUSTION ENGINE

CROSS-REFERENCE TO RELATED APPLICATION

This application is based on and claims the benefit of Japanese Patent Application No. 2018-040806, filed on Mar. 7, 2018, which is incorporated by reference herein in its entirety.

BACKGROUND

Technical Field

The present disclosure relates to a control device for an internal combustion engine, and more particularly to a control device for controlling an internal combustion engine provided with a variable valve operating device that can select a continuous valve opening mode for causing an intake valve to remain open.

Background Art

For example, JP 2014-047695 A discloses a control device for an internal combustion engine provided with a decompression device (also called a pressure reducing device) for releasing compression pressure in a cylinder. In order to reduce vibration of a vehicle body, this control device actuates the decompression device in the course of engine stop and in the course of engine start-up. Moreover, a variable valve operating device that can change the closing timing of an intake valve corresponds to an example of this compression device, and the operation of the decompression device (decompression function) is achieved by retarding the closing timing of the intake valve.

SUMMARY

An internal combustion engine provided with a variable valve operating device that can select a continuous valve opening mode for causing an intake valve to remain open is known. On the other hand, internal combustion engines typically have an issue that the startability thereof may deteriorate at a cold start.

Accordingly, it is conceivable to use the variable valve operating device having the configuration described above, in order to improve the startability at a cold start, instead of to achieve the decompression function as disclosed in JP 2014-047695 A or in addition to this.

The present disclosure has been made to address the problem described above, and an object of the present disclosure is to provide a control device for an internal combustion engine that can improve the startability of the internal combustion engine at a cold start by the use of a variable valve operating device capable of selecting a continuous valve opening mode.

A control device for controlling an internal combustion engine according to the present disclosure is configured to control an internal combustion engine that includes a fuel injection valve, an ignition device, and a variable valve operating device configured to switch between a base opening/closing mode of an intake valve for taking intake air in an intake stroke and a continuous valve opening mode that causes the intake valve to remain open.

The control device is configured to execute a cold start control at a cold start of the internal combustion engine.

The cold start control includes: a startability improvement processing executed in a predetermined number of cycles after a start of cranking; and a combustion start processing executed after the predetermined number of cycles.

The control device is configured, in the startability improvement processing, to control the variable valve operating device such that the continuous valve opening mode is selected in at least an expansion stroke and an exhaust stroke of an intake stroke, a compression stroke, the expansion stroke and the exhaust stroke, and to execute fuel injection with the fuel injection valve without ignition with the ignition device.

The control device is configured, in the combustion start processing, to control the variable valve operating device such that the base opening/closing mode is selected continuously during one cycle, and to execute ignition with the ignition device.

Strokes to which the continuous valve opening mode may be applied in the startability improvement processing are a combination of the compression stroke, the expansion stroke and the exhaust stroke, or a combination of the intake stroke, the compression stroke, the expansion stroke and the exhaust stroke.

Strokes to which the continuous valve opening mode may be applied in the startability improvement processing are a combination of the expansion stroke and the exhaust stroke, or a combination of the intake stroke, the expansion stroke and the exhaust stroke.

The predetermined number of cycles may include a plurality of cycles A. The fuel injection according to the startability improvement processing may be executed in a first cycle of the plurality of cycles A. The cold start control may include a first additional fuel injection processing that executes an additional fuel injection in at least one of a second and subsequent cycles of the plurality of cycles A and a cycle in which the combustion start processing is executed.

The predetermined number of cycles may include a plurality of cycles A. The fuel injection according to the startability improvement processing may be executed in a first cycle of the plurality of cycles A. The cold start control may include a second additional fuel injection processing that executes an additional fuel injection in each of a second and subsequent cycles of the plurality of cycles A and a cycle in which the combustion start processing is executed.

The predetermined number of cycles may include a plurality of cycles A. The fuel injection according to the startability improvement processing may be executed in a first cycle of the plurality of cycles A. When a second and subsequent cycles of the plurality of cycles A and a cycle in which the combustion start processing is executed are referred to as a plurality of cycles B, the cold start control may include a third additional fuel injection processing that executes an additional fuel injection in each of one or more cycles C, the one or more cycles C being one or more cycles of the plurality of cycles B in a reverse order of the plurality of cycles B and being a part of the plurality of cycles B.

During execution of the startability improvement processing, an exhaust valve of the internal combustion engine may be opened and closed to discharge gas in a cylinder in an exhaust stroke.

The predetermined number of cycles may be greater when a temperature correlation value that is correlated with a temperature of the internal combustion engine at the cold start is lower.

According to the control device for an internal combustion engine of the present disclosure, at a cold start of the internal combustion engine, the startability improvement processing that uses the continuous valve opening mode directed to at least the expansion stroke and exhaust stroke is executed, prior to the start of ignition, in a predetermined number of cycles. This can facilitate the mixing of the fuel and air by the use of flow-back (i.e., gas flow) of a part of the air-fuel mixture in a cylinder into an intake port. In addition, if the compression stroke is removed from the strokes to which the continuous valve opening mode is applied during execution of the startability improvement processing, vaporization of the air-fuel mixture due to a temperature increase of the air-fuel mixture as a result of compression of the air-fuel mixture in the compression stroke can also be facilitated in addition to vaporization of the air-fuel mixture due to the gas flow. As just described, according to the control device of the present disclosure, the startability of the internal combustion engine at the cold start can be improved by the use of the variable valve operating device that can select the continuous valve opening mode.

BRIEF DESCRIPTION OF THE DRAWINGS

FIG. 7 is a diagram for describing the outline of a startability improvement processing, a combustion start processing and an additional fuel injection processing according to a second embodiment of the present disclosure; and FIG. 8 is a flow chart that illustrates a routine of the processing concerning a cold start control according to the second embodiment of the present disclosure.

DETAILED DESCRIPTION

Figure 1:
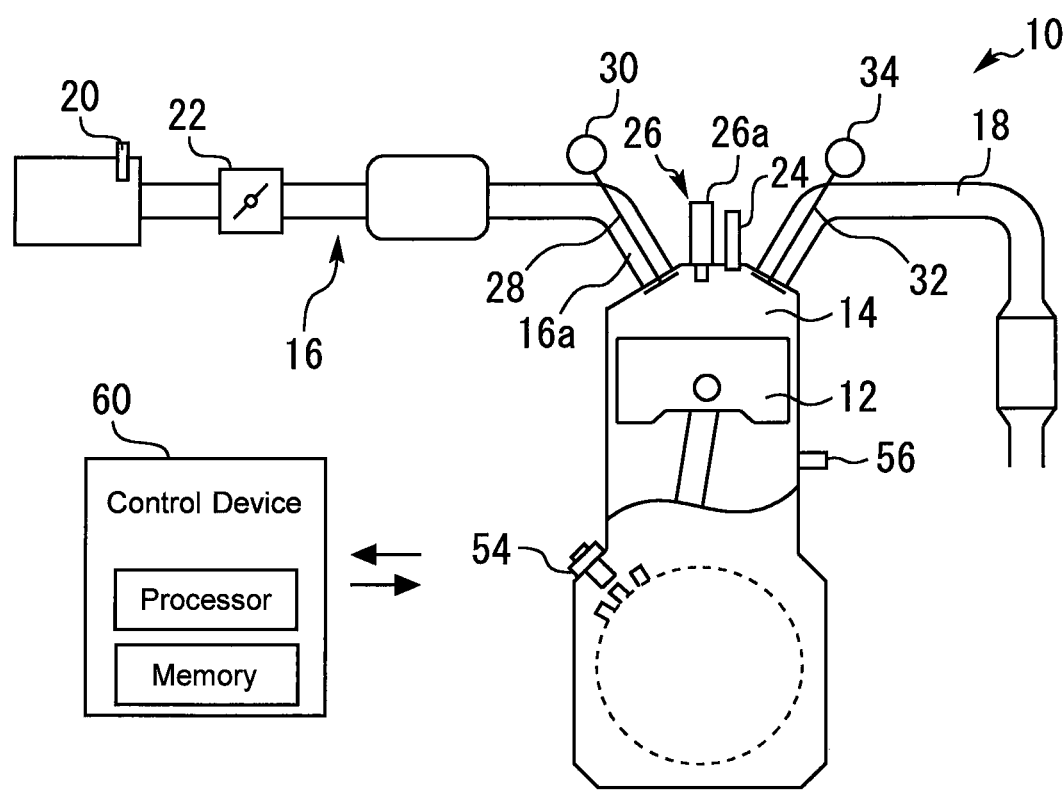
FIG. 1 is a schematic diagram for describing an example of the configuration of a system according to a first embodiment of the present disclosure.

In the following embodiments of the present disclosure, the same components in the drawings are denoted by the same reference numerals, and redundant descriptions thereof are omitted or simplified. Moreover, it is to be understood that even when the number, quantity, amount, range or other numerical attribute of an element is mentioned in the following description of the embodiments, the present disclosure is not limited to the mentioned numerical attribute unless explicitly described otherwise, or unless the present disclosure is explicitly specified by the numerical attribute theoretically. Furthermore, structures or steps or the like that are described in conjunction with the following embodiments are not necessarily essential to the present disclosure unless explicitly shown otherwise, or unless the present disclosure is explicitly specified by the structures, steps or the like theoretically.

1. First Embodiment

Firstly, a first embodiment according to the present disclosure will be described with reference to FIGS. 1 to 6.

1-1. Example of Configuration of System

FIG. 1 is a schematic diagram for describing an example of the configuration of a system according to the first embodiment of the present disclosure. The system shown in FIG. 1 is provided with a spark ignition internal combustion engine 10. The internal combustion engine 10 is mounted on a vehicle, for example. Although the internal combustion engine 10 is, as an example, an in-line four-cylinder engine, the number and arrangement of the cylinders of the internal combustion engine 10 are not particularly limited to the foregoing.

A piston 12 is arranged in each cylinder of the internal combustion engine 10. A combustion chamber 14 is formed atop the piston 12 in each cylinder. An intake air passage 16 and an exhaust gas passage 18 communicate with each combustion chamber 14. An air flow sensor 20 that outputs a signal responsive to the flow rate of the air taken into the intake air passage 16 is installed in the vicinity of an inlet of the intake air passage 16. An electronically-driven throttle valve 22 is installed in a portion of the intake air passage 16 located on the downstream side of the air flow sensor 20.

Moreover, the internal combustion engine 10 is equipped with fuel injection valves 24 and an ignition device 26 (only one of spark plugs 26a is illustrated). Each of the fuel injection valves 24 is arranged for each cylinder, and, as an example, injects fuel directly into the combustion chamber 14 (into the cylinder). The ignition device 26 ignites an air-fuel mixture in each cylinder by the use of the spark plug 26a. It should be noted that, instead of the fuel injection valve 24 or in addition to this, a fuel injection valve that injects fuel into an intake port 16a of the intake air passage 16 may be installed.

An end of the intake air passage 16 located on the side of the cylinder is opened and closed by intake valves 28. The intake valves 28 are driven to open and close by the use of an intake variable valve operating device 30 described below with reference to FIG. 2. Moreover, an end of the exhaust gas passage 18 located on the side of the cylinder is opened and closed by exhaust valves 32. The exhaust valves 32 are driven to open and close by the use of an exhaust variable valve operating device 34 to discharge the gas in the cylinder in the exhaust stroke.

Furthermore, the internal combustion engine 10 is provided with a crank angle sensor 54 that outputs a signal responsive to the crank angle, and a water temperature sensor 56 that outputs a signal responsive to the temperature of engine cooling water for cooing the internal combustion engine 10.

1-1-1. Intake Variable Valve Operating Device

The intake variable valve operating device 30 is configured to be able to switch between a "base opening/closing mode" and a "continuous valve opening mode". To be more specific, the intake variable valve operating device 30 is configured to be able to select one of these drive modes at a desired timing during one cycle. The base opening/closing mode is a general drive mode of the intake valves 28 for taking intake air in the intake stroke. In more detail, the opening timing of each intake valve 28 in the base opening/closing mode is set in the intake stroke or the exhaust stroke, and the closing timing thereof is set in the intake stroke or the compression stroke. The continuous valve opening mode corresponds to a drive mode that causes the intake valves 28 to remain open (in other words, a drive mode that causes the intake valves 28 not to be closed).

Figure 2:
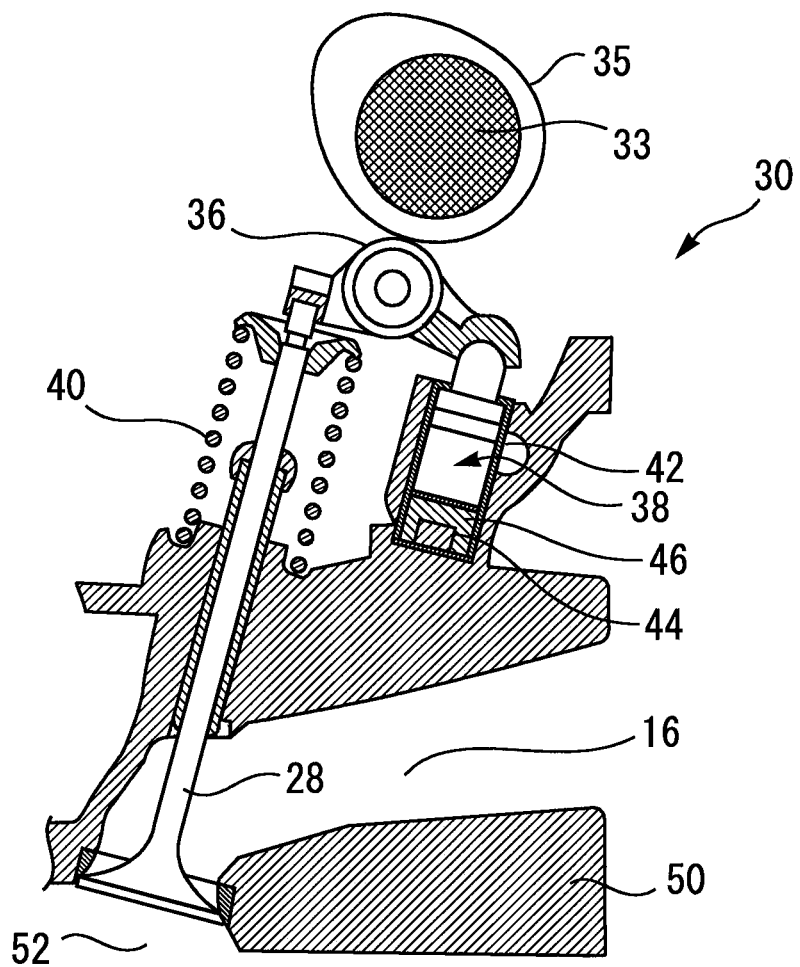
FIG. 2 is a schematic diagram for describing an example of the concrete configuration of an intake variable valve operating device shown in FIG. 1.
Figure 3:
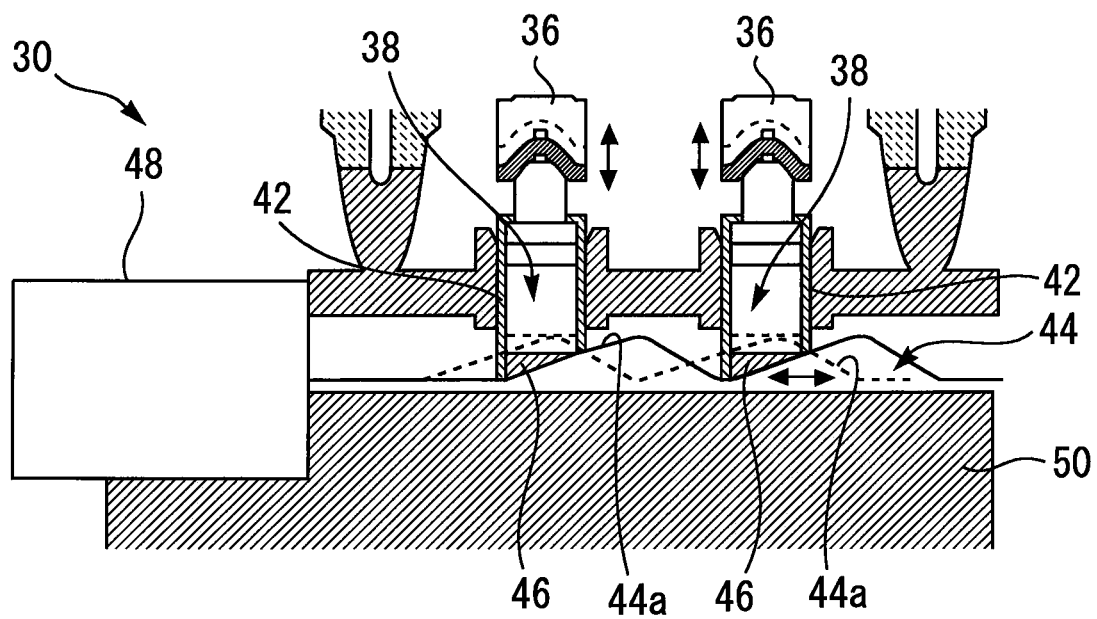
FIG. 3 is a schematic diagram for describing an example of the concrete configuration of the intake variable valve operating device shown in FIG. 1.

FIGS. 2 and 3 are schematic diagrams for describing an example of the concrete configuration of the intake variable valve operating device 30 shown in FIG. 1. It should be noted that FIGS. 2 and 3 represent the configuration provided for each cylinder of the internal combustion engine 10. As shown in FIG. 2, the intake variable valve operating device 30 is equipped with an intake camshaft 33, intake cams 35 that are fixed thereto, rocker arms 36 that respectively transmit pressing force of the intake cams 35 to the intake valves 28, and hydraulic lash adjustors (HLA) 38 that support the respective rocker arms 36 at their ends portions located on the non-valve side. Each of the intake valves 28 is urged, by a valve spring 40, in its closing direction (that is, a direction to push up the rocker arm 36).

FIG. 3 illustrates two rocker arms 36 and two HLAs 38 that are respectively associated with two (one example) intake valves 28 per cylinder. In order to achieve the continuous valve opening mode, as shown in FIG. 3, the intake variable valve operating device 30 is equipped with HLA holders 42, sliders 44, HLA lifters 46 and actuators 48.

To be more specific, each of the HLA holders 42 is fixed to a cylinder head 50, formed into a bottomed cylindrical shape and houses the corresponding HLA 38 such that it can be lifted and lowered. Each of the sliders 44 is driven by the corresponding actuator 48 to reciprocate in the cylinder row direction (i.e., the left-right direction of FIG. 3). Each slider 44 has a cam surface 44a for transforming the reciprocating motion of the slider 44 to the lifting and lowering motion of the corresponding HLA 48 (i.e., reciprocating motion in the top-bottom direction of FIG. 3). Each of the HLA lifters 46 is interposed between the bottom surface of the corresponding HLA 38 and the cam surface 44a of the corresponding slider 44. The actuators 48 are of electrically driven type, for example.

Each of the HLAs 38 operates so as to always eliminate a clearance between the intake cam 35 and the rocker 36 with its original function (i.e., expansion and contraction motion). On that basis, the position of the slider 44 is adjusted by the use of the actuator 48, and, as a result, each of the intake valves 28 can be caused to remain open, by the use of the HLA 38, regardless of application of the pressing force of the intake cam 35 to the rocker arm 36. More specifically, when the cam surface 44a is located as shown by the solid line in FIG. 3, each of the intake valves 28 normally opens and closes (i.e., base opening/closing mode). In contrast to this, if the actuator 48 is driven such that the cam surface 44a moves to a position shown by the broken line, each of the HLAs 38 lifts, by the effects of the cam surface 44a, on the side of the rocker arm 36 via the HLA lifter 46. If a state of the HLA 38 being lifted is achieved, each of the intake valves 28 can be caused to remain open regardless of application of the pressing force of the intake cam 35 to the rocker arm 36 (i.e., continuous valve opening mode).

Figure 4:
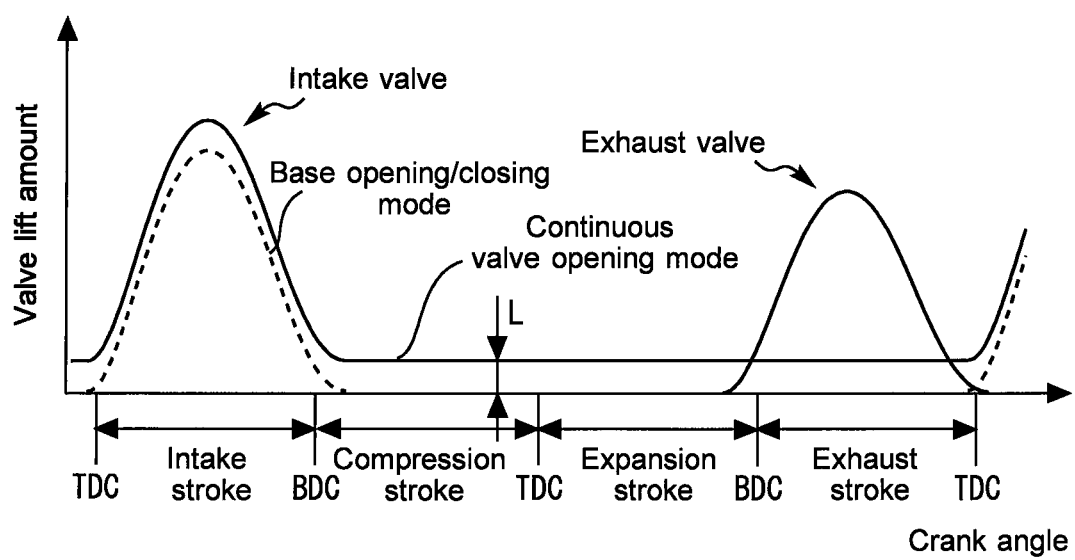
FIG. 4 shows valve lift curves that are achieved by the intake variable valve operating device.

FIG. 4 shows valve lift curves that are achieved by the intake variable valve operating device 30. According to an example shown in FIG. 4, the intake valve 28 in the base opening/closing mode (broken line) opens in the vicinity of the intake top dead center and closes in the compression stroke. It should be noted that, according to the example shown in FIG. 4, the exhaust valve 32 opens in the exhaust stroke and closes in the vicinity of the intake top dead center.

On the other hand, during the execution of the continuous valve opening mode (solid line) in which the HLA 38 has lifted as described above, before and after a lift period of the intake valve 28 by the pressing force of the intake cam 35 in the intake stroke, the intake valve 28 is not closed and remains open with a lift amount L as shown in FIG. 4. In addition, although the continuous valve opening mode is similar to the base opening/closing mode in terms of the lift amount of the intake valve 28 changing by the pressing force of the intake cam 35 in the intake stroke, the lift amount of the intake valve 28 is maintained with the lift amount L during a crank angle period in which the pressing force of the intake cam 35 is not applied to the intake valve 28. It should be noted that the "variable valve operating device" according to the present disclosure is not always required to be able to hold the lift amount of an intake valve at a constant value, as long as it can cause the intake valve to remain open in the continuous valve opening mode.

According to the intake variable valve operating device 30 configured as described so far, the drive mode can be switched between the base opening/closing mode and the continuous valve opening mode by controlling the actuator 48 at a desired timing during one cycle. In addition, since the intake variable valve operating device 30 is equipped with the actuator 48 for each cylinder, it can perform the switching of the drive mode for each cylinder.

1-1-2. Control Device

The system according to the present embodiment is provided with a control device 60 for controlling the internal combustion engine 10. The control device 60 is an electronic control unit (ECU) that includes at least one processor, at least one memory, and an input/output interface. The input/output interface receives sensor signals from various sensors mounted on the internal combustion engine 10, and also outputs actuating signals to various actuators for controlling the operation of the internal combustion engine 10. The various sensors described above include the air flow sensor 20, the crank angle sensor 54 and the water temperature sensor 56. The control device 60 can calculate an engine speed NE by the use of the signal of the crank angle sensor 54. Furthermore, the various actuators described above include the throttle valve 22, the fuel injection valves 24, the ignition device 26 and the intake variable valve operating device 30 (actuators 48) that are described above.

In the memory of the control device 60, various programs and various data (including maps) for controlling the internal combustion engine 10 are stored. The processor executes the programs stored in the memory. As a result, various functions of the control device 60 are achieved. For example, the following cold start control by the operation of the fuel injection valves 24, the ignition device 26 and the intake variable valve operating device 30 is one of the functions achieved as a result of the program being executed. It should be noted that the control device 60 may alternatively be configured with a plurality of ECUs.

1-2. Cold Start Control

Figure 5:
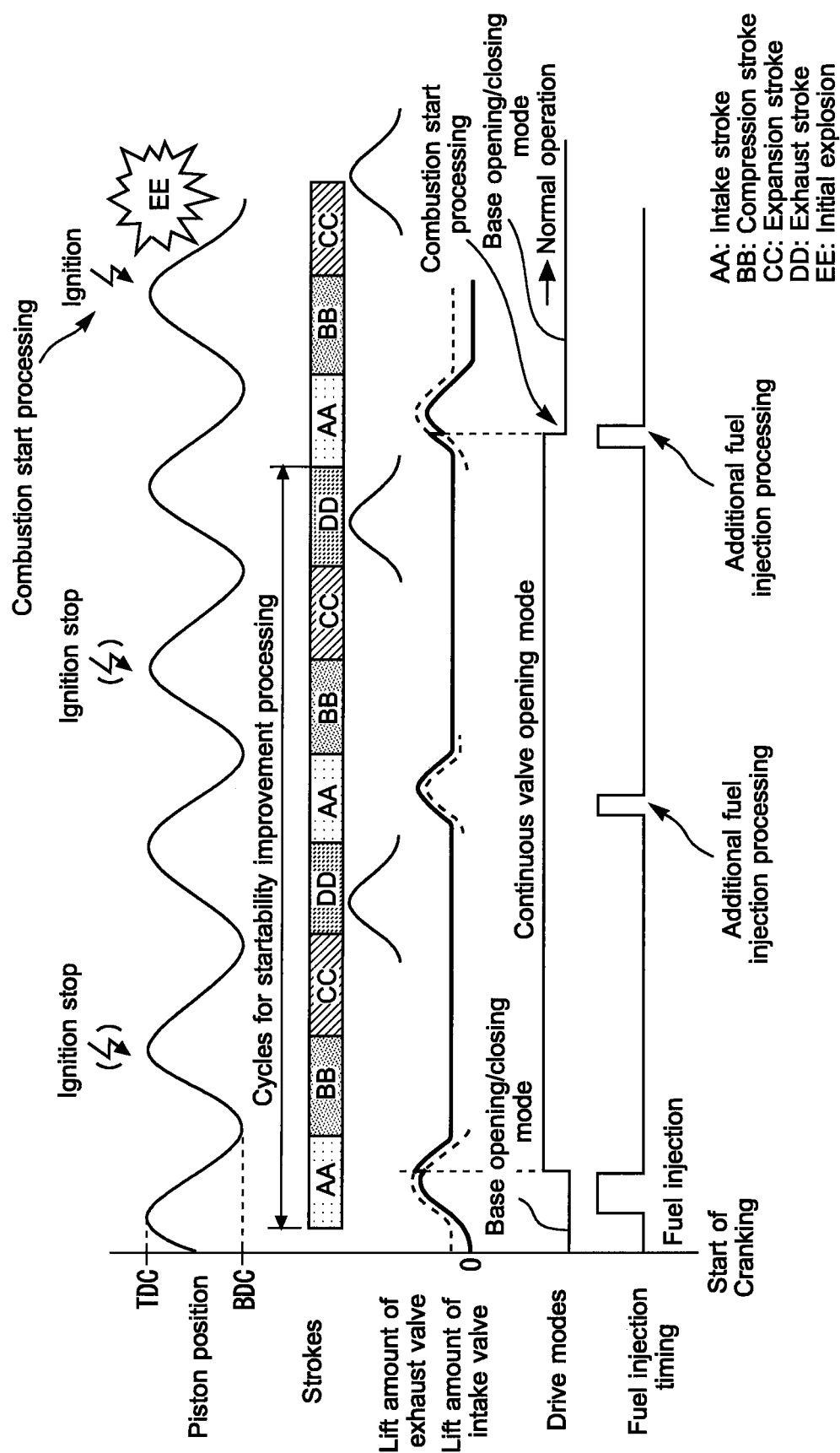
FIG. 5 is a diagram for describing the outline of a startability improvement processing, a combustion start processing and an additional fuel injection processing according to the first embodiment of the present disclosure.

Internal combustion engines typically have an issue that the startability thereof may deteriorate at a cold start. Accordingly, the control device 60 according to the present embodiment executes a "startability improvement processing", a "combustion start processing" and an "additional fuel injection processing" at the cold start, instead of a "normal start-up processing" executed at a non-cold start. FIG. 5 is a diagram for describing the outline of the startability improvement processing, the combustion start processing and the additional fuel injection processing according to the first embodiment of the present disclosure. FIG. 5 represents various operations in the course of engine start-up. The operations shown in FIG. 5 are performed in each cylinder.

It should be noted that, according to the "normal start-up processing", in order to enable combustion (more specifically, initial explosion) to be promptly started after the start of the cranking, fuel injection with a predetermined amount and ignition are executed from the first cycle after the cranking in each cylinder. In addition, the "course of engine start-up" means a time period from the start of the cranking to the start of both the fuel injection and ignition.

1-2-1. Startability Improvement Processing (Facilitation of Mixing of Fuel an Air)

The startability improvement processing is executed in a predetermined number of cycles after the start of the cranking. According to an example shown in FIG. 5, the startability improvement processing is executed in two cycles immediately after the start of the cranking.

According to the startability improvement processing of the present embodiment, the control device 60 controls the intake variable valve operating device 30 such that the continuous valve opening mode is selected in the intake stroke, the compression stroke, the expansion stroke and the exhaust stroke (that is, continuously during one cycle) as shown in FIG. 5. Also, according to the startability improvement processing, the control device 60 causes the fuel injection valve 24 to perform the fuel injection without ignition with the ignition device 26. According to the example shown in FIG. 5, this fuel injection is performed in the first cycle of the cycles targeted for the startability improvement processing.

To be more specific, the fuel injection at the first cycle of the cycles for the startability improvement processing is executed with the same amount as that for the normal start-up processing described above (that is, the amount required to produce an initial explosion in an example in which the ignition (sparking) is performed along with the fuel injection in the first cycle). Moreover, according to the example shown in FIG. 5, switching from the base opening/closing mode to the continuous valve opening mode for execution of the startability improvement processing is executed in the intake stroke of the first cycle after the start of the cranking.

During execution of the startability improvement processing, the compression stroke arrives with the intake valve 28 open due to the switching to the continuous valve opening mode. As a result, the air-fuel mixture (air and fuel) in the cylinder is flown back to the intake port 16a in the compression stroke. Vaporization of fuel, and mixing of the fuel and air (fresh air) are facilitated by a gas flow produced in association with the flow-back as just described.

Moreover, during the execution of the startability improvement processing, the intake valve 28 remains open also in the expansion stroke. Because of this, the fuel and air that were flown back into the intake port 16a in the compression stroke are taken into the cylinder again from the intake port 16a in the expansion stroke. Vaporization of fuel, and mixing of the fuel and air (fresh air) are further facilitated by a gas flow produced in association with the fuel and air being taken into the cylinder again as just described.

Furthermore, during the execution of the startability improvement processing, the intake valve 28 remains open also in the exhaust stroke. On the other hand, the exhaust valve 32 is normally opened and closed. Because of this, in the exhaust stroke, a part of the air-fuel mixture (fuel and air) in the cylinder is discharged into the exhaust gas passage 18 and the rest is flown back into the intake port 16a. In this way, during the execution of the startability improvement processing, the flow-back of the air-fuel mixture into the intake port 16a during one cycle is performed twice.

1-2-2. Combustion Start Processing

The combustion start processing is executed after the lapse of a plurality number of cycles that are targeted for the startability improvement processing. According to the example shown in FIG. 5, the combustion start processing is executed in a cycle next to the last cycle of the cycles for the startability improvement processing.

According to the combustion start processing, as shown in FIG. 5, the control device 60 controls the intake variable valve operating device 30 such that the base opening/closing mode is selected (continuously during one cycle) and performs the ignition with the ignition device 26. That is to say, the startability is enhanced by the execution of the startability improvement processing (i.e., facilitation of mixing of the fuel and the air) and then the ignition is performed. As a result, the initial explosion can be more easily produced at the cold start. Thereafter, the normal operation of the internal combustion engine 10 is performed.

1-2-3. Additional Fuel Injection Processing

As shown in FIG. 5, the additional fuel injection processing is executed in the second and subsequent cycles of the cycles for the startability improvement processing (in the example shown in FIG. 5, only the second cycle) and a cycle in which the combustion start processing is performed. In the present embodiment, this additional injection is executed to achieve the following two purposes. One of these purposes is to refill a fuel whose amount is equivalent to the amount of fuel included in the air-fuel mixture that was discharged into the exhaust gas passage 18 in the exhaust stroke in the last cycle, in order to maintain a favorable air-fuel ratio for the initial explosion. Also, the other of those purposes is to refill a fuel whose amount depends on the fresh air amount that increases with an increase of the number of cycles due to an increase of the engine speed NE as a result of the cranking, in order to similarly maintain a favorable air-fuel-ratio.

It should be noted that the additional fuel injection processing performed in the present embodiment corresponds to an example of each of the "first additional fuel injection processing" and the "second additional fuel injection processing" according to the present disclosure. Moreover, in another example in which an exhaust variable valve operating device that can stop the exhaust valve 32 in a stopped state is provided instead of the exhaust variable valve operating device 34 described above and the exhaust valve 32 is stopped in the stopped state during execution of the startability improvement processing, an additional fuel injection processing executed to achieve the former purpose described above is not required. Furthermore, in still another example in which the fuel whose amount is determined with taking into consideration an increase of the engine speed NE during lapse of the cycles targeted for the startability improvement processing is collectively injected in, for example, the first cycle of the cycles targeted for the startability improvement processing, an additional fuel injection processing for achieving the latter purpose described above is not required. Based on the above, it is not always necessary to associate the additional fuel injection processing according to the present disclosure with the startability improvement processing.

1-2-4. Processing of Control Device Concerning Cold Start Control

Figure 6:
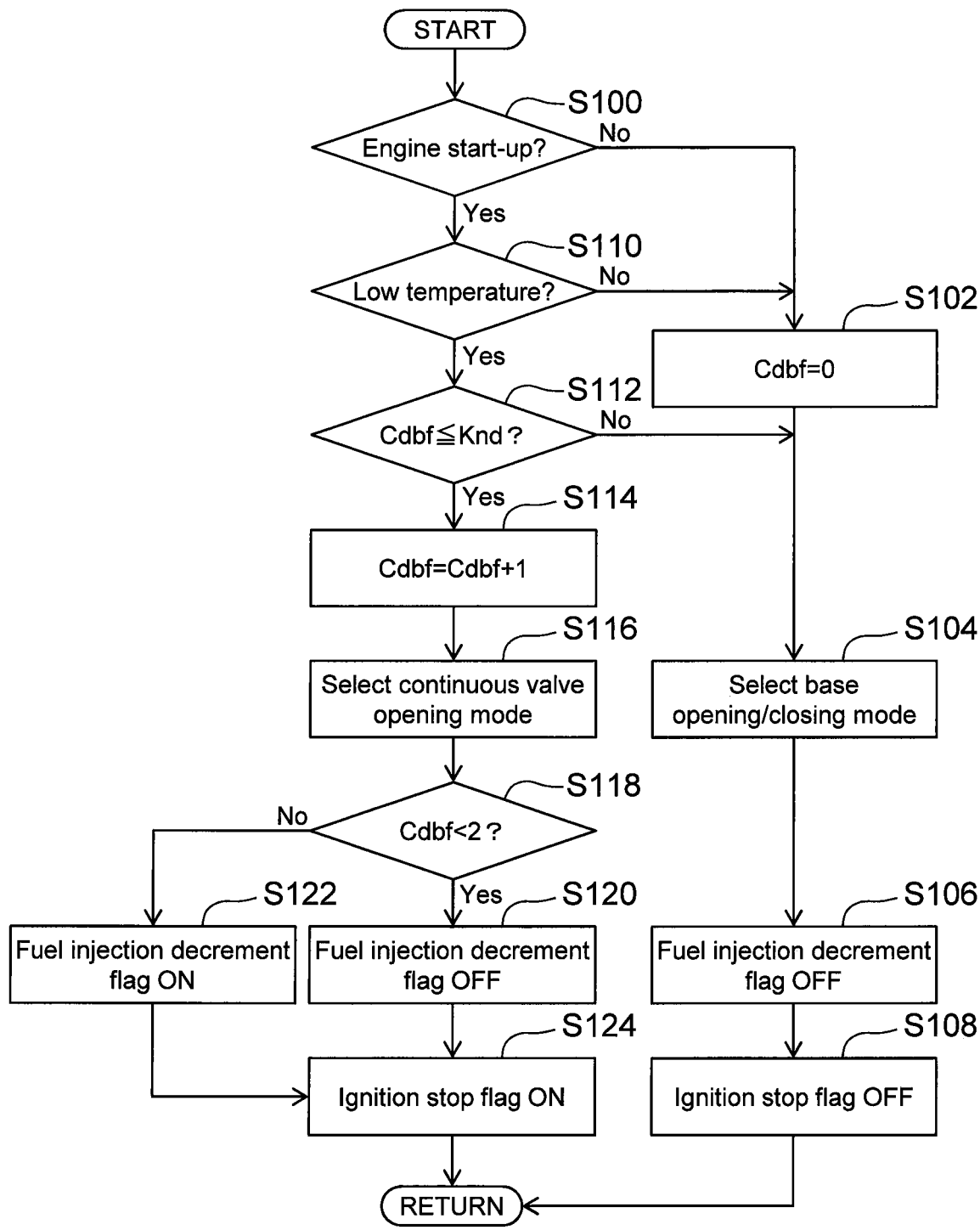
FIG. 6 is a flow chart that illustrates a routine of the processing concerning a cold start control according to the first embodiment of the present disclosure.

FIG. 6 is a flow chart that illustrates a routine of the processing concerning the cold start control according to the first embodiment of the present disclosure. The control device 60 repeatedly executes the processing of the present routine for each cylinder and for each cycle (720 degrees) of the internal combustion engine 10.

According to the routine shown in FIG. 6, firstly, the control device 60 determines whether or not the internal combustion engine 10 is in the course of start-up (step S100). Whether or not this determination is met is performed on the basis of, for example, whether or not the engine speed NE is lower than a predetermined threshold value (for example, 400 rpm).

If the determination result of step S100 is negative, the control device 60 executes the processing of steps S102 to S108. In step S102, the control device 60 resets a counter value Cdbf to zero. The counter value Cdbf corresponds to the number of cycles in which the startability improvement processing is executed. In step S104, the control device 60 controls the intake variable valve operating device 30 such that the base opening/closing mode is selected. If the processing repeatedly proceeds to step S104 during execution of the startability improvement processing, the base opening/closing mode is maintained.

In step S106, the control device 60 turns OFF a fuel injection decrement flag. According to the present embodiment, the control device 60 executes fuel injection for each cycle except when a predetermined fuel cut execution condition is met. If the fuel injection decrement flag is turned OFF, decrement of the fuel injection amount associated with the additional fuel injection processing described above is not executed.

In step S108, the control device 60 turns OFF an ignition stop flag. According to the present embodiment, the control device 60 executes ignition (sparking) for each cycle except when the ignition stop flag is turned ON. Because of this, if the processing proceeds to step S108, the ignition with the ignition device 26 is not stopped.

If, on the other hand, the determination result of step S100 is positive, the control device 60 then determines whether or not the internal combustion engine 10 is in a low temperature state (step S110). Whether or not this determination is met is performed on the basis of, for example, whether or not the temperature of the engine cooling water detected by the water temperature sensor 56 is lower than a predetermined threshold value (for example, −20 degrees C.).

If the determination result of step S110 is negative, the control device 60 executes the processing of steps S102 to S108 described above. If, on the other hand, the determination result of step S110 is positive, that is, if the current engine-start-up corresponds to a cold start, the processing proceeds to step S112.

In step S112, the control device 60 determines whether or not the counter value Cdbf is smaller than or equal to a predetermined threshold value Knd. The threshold value Knd is a desired integer greater than or equal to 1 (for example, 1 to 10). As an example, according to the present embodiment, the threshold value Knd is changed in accordance with the temperature of the internal combustion engine 10 at the cold start. In more detail, the engine cooling water temperature is herein used as an example of the "temperature correlation value" that is correlated with the temperature of the internal combustion engine 10 at the cold start. Also, the threshold value Knd is set to be greater when the engine cooling water temperature is lower. It should be noted that the threshold value Knd may alternatively be a fixed value. In addition, one of other examples of the temperature correlation value described above is an engine lubrication oil temperature.

If the determination result of step S112 is positive (Cdbf≤Knd), the control device 60 executes the processing of steps S114 to S124 concerning the startability improvement processing. In step S114, the control device 60 adds 1 to the counter value Cdbf. Thus, the counter value Cdbf is increased one by one for each cycle.

In step S116, the control device 60 controls the intake variable valve operating device 30 such that the continuous valve opening mode is selected. When the processing repeatedly proceeds to step S116 during execution of the startability improvement processing, the continuous valve opening mode is maintained. In step S118, it is determined whether or not the counter value Cdbf is smaller than 2.

If the determination result of step S118 is positive (Cdbf=1), that is, in the first cycle of the cycles in which the startability improvement processing is performed, the processing proceeds to step S120. In step S120, the control device 60 turns OFF the fuel injection decrement flag. As a result, the fuel injection amount with the fuel injection valve 24 in this cycle is not decreased in association with the additional fuel injection processing. That is to say, in this cycle, the base injection amount for this cycle (i.e., an amount that is defined by the normal start-up processing described above) is used without correction thereof.

If, on the other hand, the determination result of step S118 is negative (Cdbf≥2), that is, in the second and subsequent cycles of the cycles targeted for the startability improvement processing), the processing proceeds to step S122. In step S122, the control device 60 turns ON the fuel injection decrement flag. As a result, the fuel injection amount by the fuel injection valve 24 in this cycle is decreased so as to be equal to the amount according to the additional fuel injection processing. More specifically, the fuel injection in this cycle corresponds to a fuel injection executed by the additional fuel injection processing, and the value obtained by subtracting a predetermined decrement value from the base injection amount for this cycle is used as a fuel injection amount based on the additional fuel injection processing. The decrement value described above corresponds to a value that is determined in advance so as to achieve the two purposes described above (for example, a value about the half of the base injection amount described above).

After the processing of step S120 or S122, the processing proceeds to step S124. In step S124, the control device 60 turns ON the ignition stop flag. As a result, the ignition with the ignition device 26 is stopped in the cycles targeted for the startability improvement processing.

If, on the other hand, the determination result of step S112 is negative (Cdbf>Knd), the startability improvement processing is ended and the processing proceeds to step S104. As a result, the "predetermined number of cycles" in which the startability improvement processing is performed coincides with cycles whose number is equal to the threshold value Knd. In addition, the cycle at which the determination result of step S112 becomes negative first is a cycle next to the last cycle of the cycles targeted for the startability improvement processing, and corresponds to a cycle at which the combustion start processing is executed.

According to the processing of the present routine, in the cycle at which the combustion start processing is executed, switching to the base opening/closing mode is performed by the processing of step S104, and also the ignition is started due to the ignition stop flag being turned OFF. It should be noted that, in order to enable, similarly to the example shown in FIG. 5, the additional fuel injection processing to be executed in the cycle at which the combustion start processing is executed, the processing of the routine shown in FIG. 6 may be changed such that, when the determination result of step S112 becomes negative first at the cold start, the fuel injection decrement flag is turned ON.

1-3. Advantageous Effects Concerning Cold Start Control

According to the cold start control of the present embodiment described so far, prior to the start of the ignition, the startability improvement processing is executed in a predetermined number of cycles. According to the startability improvement processing, a part of the air-fuel mixture in each cylinder is flown back into the intake port 16a each time when the piston 12 ascends during one cycle (that is, in the compression stroke and the exhaust stroke). This makes it possible to facilitate the mixing of the fuel and the air (fresh air) including facilitation of vaporization of the injected fuel. In addition, after a favorable air-fuel mixture is formed in order to improve the startability in this way, the ignition is started by the combustion start processing. Therefore, the startability at the cold start can be effectively improved.

Additionally, in the example of the continuous valve opening mode according to the first embodiment, the continuous valve opening mode is executed in the compression stroke as well as the other strokes. Because of this, in this example, the intake variable valve operating device 30 also functions as a decompression device for releasing in-cylinder pressure during the compression stroke of each cylinder (i.e., compression pressure). Therefore, the startability at the cold start can be improved while being accompanied by the effects of reduction of vibration and noise by this kind of decompression function. In addition, it can also be said that, in the startability improvement processing according to the first embodiment, the fuel injection is performed during actuation of the decompression device. Moreover, the counter value Cdbf described above also corresponds to the number of actuation of the decompression device.

Moreover, according to the cold start control of the present embodiment, the additional fuel injection processing described above is executed in the second and subsequent cycles of the plurality of cycles A targeted for the startability improvement processing. This makes it possible to refill the fuel whose amount is associated with the fresh air amount that increases with an increase of the number of cycles due to an increase of the engine speed NE. In addition, according to the internal combustion engine 10 in which the exhaust valve 32 is normally opened and closed during execution of the startability improvement processing, the fuel whose amount is equivalent to a fuel injection amount that is included in the air-fuel mixture that has been discharged into the exhaust gas passage 18 can also be refilled. These also apply to an example where the additional fuel injection processing is executed in a cycle in which the combustion start processing is executed (such as, the third cycle in the example shown in FIG. 5).

Moreover, the additional fuel injection processing may alternatively be executed so as to collectively inject an additional fuel in a designated one cycle. In contrast to this, according to the processing of the routine shown in FIG. 6, if the threshold value Knd is three or more, the additional fuel injection processing according to the present embodiment is executed in "each" of the second and subsequent cycles of the plurality of cycles A targeted for the startability improvement processing. As a result, the additional fuel is injected separately in the cycles. Therefore, the mixing of an injected fuel and the air can be more effectively performed as compared to the example in which the additional fuel is collectively injected in a designated one cycle.

Furthermore, according to the cold start control of the present embodiment, the threshold value Knd for determining the number of cycles for the startability improvement processing is set to be greater when the temperature of the internal combustion engine 10 at the cold start (for example, engine cooling water temperature) is lower. As a result, the lower the temperature of the internal combustion engine 10 is, the greater the predetermined number of cycles for the startability improvement processing becomes. It can be said that, when this number of cycles is greater, the mixing of the fuel and the air is facilitated more effectively. Therefore, according to this kind of setting, the startability improvement processing can be performed such that the startability can be improved more properly in accordance with the temperature of the internal combustion engine 10 at the cold start.

1-4. Another Example of Startability Improvement Processing

The first embodiment has described the example in which the strokes in which the continuous valve opening mode is selected in the startability improvement processing is all of the intake stroke, the compression stroke, the expansion stroke and the exhaust stroke. However, in another example of the startability improvement processing that is executed in the compression stroke as well as the expansion stroke and the exhaust stroke as in the first embodiment, the continuous valve opening mode may be selected only in the compression stroke, the expansion stroke and the exhaust stroke other than the intake stroke. That is to say, with respect to the intake stroke, the base opening/closing mode may alternatively be selected.

2. Second Embodiment

Next, a second embodiment according to the present disclosure will be described with reference to FIGS. 7 and 8. In the following explanation, it is supposed that the configuration shown in FIGS. 1 to 3 is used as an example of the configuration of a system according to the second embodiment.

2-1. Cold Start Control

The cold start control according to the present embodiment is different from the cold start control according to the first embodiment mainly in terms of the compression stroke being removed from the strokes to which the continuous valve opening mode is applied in the startability improvement processing. FIG. 7 is a diagram for describing the outline of a startability improvement processing, a combustion start processing and an additional fuel injection processing according to the second embodiment of the present disclosure. The following explanation will be focused on the difference of the example shown in FIG. 7 with respect to the example shown in FIG. 5. It should be noted that, in the explanation of the present embodiment, the compression top dead center (i.e., expansion top dead center) is 0 deg.

2-1-1. Startability Improvement Processing (Facilitation of Mixing of Fuel and Air with Gas Flow and Temperature Increase)

According to the startability improvement processing of the present embodiment, as shown in FIG. 7, the control device 60 controls the intake variable valve operating device 30 such that the continuous valve opening mode is selected in each stroke except for the compression stroke (that is, in the intake stroke, the expansion stroke and the exhaust stroke).

Accordingly, in the compression stroke, compression of the air-fuel mixture in the cylinder is normally performed because the base opening/closing mode is selected. As a result, an energy is applied to the gas in the cylinder, and the in-cylinder pressure and the in-cylinder gas temperature thereby increase. Because of this, the wall of the combustion chamber 14 can be warmed up, and vaporization of the injected fuel that is charged into the cylinder and also vaporization of the fuel attached to the wall surface of the combustion chamber 14 are facilitated.

Moreover, during execution of the startability improvement processing, switching from the base opening/closing mode to the continuous valve opening mode is performed in the vicinity of the compression top dead center. This allows the air-fuel mixture pressurized in the compression stroke to be flown back toward the intake port 16a from the cylinder at high speed. As a result, mixing of the fuel and the air included in the air-fuel mixture that is flown back is further facilitated, and a part of the kinetic energy of the air-fuel mixture also contributes to a temperature increase of the wall of the intake port 16a.

In the later stage of the expansion stroke thereafter, the air-fuel mixture that has already been flown back into the intake port 16a is suctioned again into the cylinder. Due to a gas flow at this time, mixing of the fuel and the air included in the air-fuel mixture is further facilitated.

Moreover, similarly to the startability improvement processing according to the first embodiment, the intake valve 28 remains open in the exhaust stroke also during execution of the startability improvement processing according to the present embodiment. Because of this, similarly to the first embodiment, the opportunity of flow back of the air-fuel mixture into the intake port 16a per one cycle can be increased.

Furthermore, the waveforms of various temperatures in FIG. 7 schematically represent how the respective air-fuel mixture temperatures in both the cylinder and the intake port 16a, and the combustion chamber wall temperature increase with an increase of the number of cycles associated with the execution of the startability improvement processing.

2-1-2. Processing of Control Device Concerning Cold Start Control

FIG. 8 is a flow chart that illustrates a routine of the processing concerning the cold start control according to the second embodiment of the present disclosure. The control device 60 repeatedly executes the processing of the present routine for each cylinder at each timing of 0 degree (compression top dead center), 180 degrees, 360 degrees and 540 degrees. It should be noted that the processing of steps S100 to S112, and S118 to S124 in the routine shown in FIG. 8 is as already described in the first embodiment.

According to the routine shown in FIG. 8, if the determination result of step S112 is positive (Cdbf≤Knd), the control device 60 executes the processing of steps S200 to S208, instead of the processing of steps S114 and S116 of the routine shown in FIG. 6. That is to say, according to the routine shown in FIG. 8, a part of the processing concerning the startability improvement processing is different from that of the routine shown in FIG. 6.

In detail, according to step S200, it is determined whether or not the current piston position of the cylinder targeted for the execution of the processing of the present routine is at 0 degrees (i.e., compression top dead center). If, as a result, this determination result is positive, the processing proceeds to step S202. In step S202, the control device 60 controls the intake variable valve operating device 30 such that the continuous valve opening mode is selected. Then, in step S204, the control device 60 adds 1 to the counter value Cdbf. According to this processing, the counter value Cdbf is increased one by one for every 720 degrees (one cycle). The processing proceeds to step S118 thereafter.

If, on the other hand, the determination result of step S200 is negative, the processing proceeds to step S206. In step S206, the control device 60 determines whether or not the current piston position is at 540 degrees (i.e., intake bottom dead center). If, as a result, this determination result is positive, the processing proceeds to S208. In step S208, the control device 60 controls the intake variable valve operating device 30 such that the base opening/closing mode is selected. The processing proceeds to step S118 thereafter.

Furthermore, if the determination result of step S206 is negative, that is, if the current piston position is at 180 degrees (i.e., expansion bottom dead center) or 360 degrees (i.e., exhaust top dead center), the processing directly proceeds to step S118.

2-2. Advantageous Effects Concerning Cold Start Control

As described so far, according to the startability improvement processing of the present embodiment, the intake valve 28 is not caused to remain open in the compression stroke (that is, is controlled such that compression of the air-fuel mixture is performed) and is caused to remain open in the expansion stroke and the exhaust stroke. This makes it possible to facilitate the vaporization of the air-fuel mixture due to a temperature increase of the air-fuel mixture in addition to facilitation of the mixing of the fuel and the air due to the flow of the air-fuel mixture. Therefore, the startability at the cold start can be more effectively improved.

2-3. Modification Example Concerning Second Embodiment
2-3-1. Another Example of Additional Fuel Injection Processing (Corresponding to "Third Additional Fuel Injection Processing" According to Present Disclosure)

The additional fuel injection processing combined with the startability improvement processing according to the second embodiment may alternatively be executed as follows, for example. That is to say, the predetermined number of cycles targeted for the startability improvement processing may include a plurality of cycles A, and the fuel injection may alternatively be executed in the first cycle of this plurality of cycles A targeted for the startability improvement processing similarly to the example shown in FIG. 7. On that basis, when the second and subsequent cycles of the plurality of cycles A and the cycle in which the combustion start processing is performed are referred to as a "plurality of cycles B", the additional fuel injection may alternatively be executed in each of "one or more cycles C", which are one or more cycles of the plurality of cycles B in the reverse order of the plurality of cycles B and are a part of the plurality of cycles B (in the example shown in FIG. 7, the third cycle after the start of the cranking). According to this kind of example, by causing one or more cycles at the initial stage of the startability improvement processing not to be accompanied by the additional fuel injection, the in-cylinder gas temperature can be effectively increased without a decrease of the gas temperature due to the vaporization of the fuel injected by the additional fuel injection. Also, after increasing the in-cylinder gas temperature, the additional fuel injection can be performed in the subsequent one or more cycles in order to maintain a favorable air-fuel ratio for the initial explosion.

2-3-2. Another Example of Cycles in Which Fuel Injection by Startability Improvement Processing Is Performed In the second embodiment described above, the fuel injection by the startability improvement processing is executed in the first cycle of a plurality of cycles A targeted for the startability improvement processing, and the fuel injection according to the additional fuel injection processing is executed in the second and subsequent cycles of the plurality of cycles A described above. However, cycles in which the fuel injection according to the startability improvement processing of the second embodiment (i.e., that corresponds to an example where the compression stroke is removed from strokes to which the continuous valve opening mode is applied) is performed may be the second and subsequent cycles, instead of the first cycle described above. In detail, in an example in which the "third additional fuel injection processing" described above is combined with the startability improvement processing, the fuel injection according to the startability improvement processing may alternatively be executed in one cycle immediately before the above-described "one or more cycles C" in which this additional fuel injection processing is performed. According to this kind of example, not only the fuel injection according to the additional fuel injection processing but also the fuel injection according to the startability improvement processing is executed intensively in a plurality of cycles closer to the cycle in which the combustion start processing (start of ignition) is performed. This makes it possible to increase the in-cylinder gas temperature prior to the fuel injection according to the startability improvement processing and to then perform this fuel injection.

2-3-3. Another Example of Startability Improvement Processing

The second embodiment has described the example where the strokes to which the continuous valve opening mode is applied in the startability improvement processing are the intake stroke, the expansion stroke and the exhaust stroke. However, in another example of the startability improvement processing in which the expansion stroke and the exhaust stroke are applied to the continuous valve opening mode without including the compression stroke as in the second embodiment, only the expansion stroke and the exhaust stroke may be applied to the continuous valve opening mode also except for the intake stroke. That is to say, with respect to the intake stroke, the base opening/closing mode may be selected as well as the compression stroke. Consequently, the timing at which switching from the continuous valve opening mode to the base opening/closing mode may be at 360 degrees (i.e., exhaust top dead center).

The embodiments and modification examples described above may be combined in other ways than those explicitly described above as required and may be modified in various ways without departing from the scope of the present disclosure.

What is claimed is:

1. A control device for an internal combustion engine,
the internal combustion engine including a fuel injection valve, an ignition device, and a variable valve operating device configured to switch between a base opening/closing mode of an intake valve for taking intake air in an intake stroke and a continuous valve opening mode that causes the intake valve to remain open,
wherein the control device is configured to execute a cold start control at a cold start of the internal combustion engine,
wherein the cold start control includes:
a startability improvement processing executed in a predetermined number of cycles after a start of cranking; and
a combustion start processing executed after the predetermined number of cycles,
wherein the control device is configured, in the startability improvement processing, to control the variable valve operating device such that the continuous valve opening mode is selected in at least an expansion stroke and an exhaust stroke of an intake stroke, a compression stroke, the expansion stroke and the exhaust stroke, and to execute fuel injection with the fuel injection valve without ignition with the ignition device, and
wherein the control device is configured, in the combustion start processing, to control the variable valve operating device such that the base opening/closing mode is selected continuously during one cycle, and to execute ignition with the ignition device.

2. The control device according to claim 1,
wherein strokes to which the continuous valve opening mode is applied in the startability improvement processing are a combination of the compression stroke, the expansion stroke and the exhaust stroke, or a combination of the intake stroke, the compression stroke, the expansion stroke and the exhaust stroke.

3. The control device according to claim 1,
wherein strokes to which the continuous valve opening mode is applied in the startability improvement processing are a combination of the expansion stroke and the exhaust stroke, or a combination of the intake stroke, the expansion stroke and the exhaust stroke.

4. The control device according to claim 3,
wherein the predetermined number of cycles includes a plurality of cycles A,
wherein the fuel injection according to the startability improvement processing is executed in a first cycle of the plurality of cycles A, and
wherein, when a second and subsequent cycles of the plurality of cycles A and a cycle in which the combustion start processing is executed are referred to as a plurality of cycles B, the cold start control includes a third additional fuel injection processing that executes an additional fuel injection in each of one or more cycles C, the one or more cycles C being one or more cycles of the plurality of cycles B in a reverse order of the plurality of cycles B and being a part of the plurality of cycles B.

5. The control device according to claim 4,
wherein, during execution of the startability improvement processing, an exhaust valve of the internal combustion engine is opened and closed to discharge gas in a cylinder in an exhaust stroke.

6. The control device according to claim 1,
wherein the predetermined number of cycles includes a plurality of cycles A,
wherein the fuel injection according to the startability improvement processing is executed in a first cycle of the plurality of cycles A, and
wherein the cold start control includes a first additional fuel injection processing that executes an additional fuel injection in at least one of a second and subsequent cycles of the plurality of cycles A and a cycle in which the combustion start processing is executed.

7. The control device according to claim 6,
wherein, during execution of the startability improvement processing, an exhaust valve of the internal combustion engine is opened and closed to discharge gas in a cylinder in an exhaust stroke.

8. The control device according to claim 1,
wherein the predetermined number of cycles includes a plurality of cycles A,
wherein the fuel injection according to the startability improvement processing is executed in a first cycle of the plurality of cycles A, and
wherein the cold start control includes a second additional fuel injection processing that executes an additional fuel injection in each of a second and subsequent cycles of the plurality of cycles A and a cycle in which the combustion start processing is executed.

9. The control device according to claim 8,
wherein, during execution of the startability improvement processing, an exhaust valve of the internal combustion engine is opened and closed to discharge gas in a cylinder in an exhaust stroke.

10. The control device according to claim 1,
wherein the predetermined number of cycles is greater when a temperature correlation value that is correlated with a temperature of the internal combustion engine at the cold start is lower.

* * * * *

UNITED STATES PATENT AND TRADEMARK OFFICE
CERTIFICATE OF CORRECTION

PATENT NO. : 10,655,546 B2  
APPLICATION NO. : 16/245659  
DATED : May 19, 2020  
INVENTOR(S) : Shigeki Miyashita Page 1 of 1

It is certified that error appears in the above-identified patent and that said Letters Patent is hereby corrected as shown below:

In the Claims

Column 16, Claim number 4, Line number 19, change "claim 3," to --claim 1,--

Column 16, Claim number 5, Line number 35, change "claim 4," to --claim 1,--

Column 16, Claim number 6, Line number 40, change "claim 1," to --claim 3--

Column 16, Claim number 7, Line number 51, change "claim 6," to --claim 4,--

Column 16, Claim number 8, Line number 56, change "claim 1," to --claim 5,--

Column 17, Claim number 9, Line number 1, change "claim 8," to --claim 6,--

Signed and Sealed this  
Twenty-fifth Day of August, 2020

Andrei Iancu  
*Director of the United States Patent and Trademark Office*